(12) United States Patent
Tezuka et al.

(10) Patent No.: US 6,527,640 B1
(45) Date of Patent: Mar. 4, 2003

(54) VIDEO SCREEN INDICATED POSITION DETECTING METHOD AND DEVICE

(75) Inventors: Morihisa Tezuka, Tokyo (JP); Makoto Tamaki, Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

(21) Appl. No.: 09/495,775

(22) Filed: Feb. 1, 2000

(30) Foreign Application Priority Data

Feb. 2, 1999 (JP) .......................................... 11-025222

(51) Int. Cl.⁷ .............................................. A63F 13/00
(52) U.S. Cl. ............................................ 463/37; 463/2
(58) Field of Search ................................ 463/2, 36–39, 463/49, 50, 51, 52; 434/16, 17, 20, 21; 345/181

(56) References Cited

U.S. PATENT DOCUMENTS

| | | | | |
|---|---|---|---|---|
| 4,223,454 A | * | 9/1980 | Mohon et al. ................. | 434/20 |
| 4,335,380 A | * | 6/1982 | Wright ......................... | 345/13 |
| 4,619,616 A | * | 10/1986 | Clarke ......................... | 434/22 |
| 4,813,682 A | * | 3/1989 | Okada .......................... | 463/5 |
| 4,922,420 A | * | 5/1990 | Nakagawa .................... | 463/29 |
| 5,194,008 A | * | 3/1993 | Mohan et al. ............... | 348/121 |
| 5,351,969 A | * | 10/1994 | Smith, III et al. .............. | 463/5 |
| 5,691,749 A | * | 11/1997 | Sugiyama .................... | 345/181 |
| 5,926,168 A | * | 7/1999 | Fan ............................. | 345/158 |
| 6,012,980 A | * | 1/2000 | Yoshida et al. ................. | 463/2 |
| 6,028,589 A | * | 2/2000 | Mehra et al. ................ | 345/603 |
| 6,146,278 A | * | 11/2000 | Kobayashi .................... | 463/53 |
| 6,171,190 B1 | * | 1/2001 | Thanasack .................... | 463/51 |
| 6,293,869 B1 | * | 9/2001 | Kwan et al. ................. | 273/371 |
| 6,328,650 B1 | * | 12/2001 | Fukawa et al. .......... | 273/148 B |

OTHER PUBLICATIONS

IBM technical disclosure, versatile input device and technology for crt terminal, Nov. 1990.*

* cited by examiner

*Primary Examiner*—Valencia Martin-Wallace
*Assistant Examiner*—John M Hotaling, II
(74) *Attorney, Agent, or Firm*—Dickstein Shapiro Morin & Oshinsky LLP

(57) ABSTRACT

When a trigger signal is outputted from a simulated gun 30A to 30D, a trigger image is displayed on image monitor means 20 in response to the trigger signal. In response to a timing signal of the simulated gun 30A to 30D, an indicated position, a value of an image display counter 12 at the time is set in a register 13. Coordinate values of the indicated position of the simulated gun 30A to 30D set in the register 13 is inputted to a game control unit 14 in a horizontal flyback time of a scanning line. The indicated position detection processing for detecting indicated positions indicated on the image monitor means 20 by the simulated guns 30A to 30D is performed at every horizontal scan displaying the video screen. The video screen indicated position detecting method and device is quick in responding to an indication even when a plurality of indicated positions are detected, without increasing costs of the device.

15 Claims, 12 Drawing Sheets

SS

HS

VS

ST

R.G.B

VIDEO SCREEN INDICATED POSITION DETECTING METHOD AND DEVICE

BACKGROUND OF THE INVENTION

The present invention relates to a video screen indicated position detecting method and device for detecting a target position on a video screen for use in, e.g., a shooting game apparatus or others in which targets displayed on the game screen are shot by game players by shooting input units.

Generally a shooting game apparatus comprises a simulated gun to be operated by a game player, a game control unit incorporated in the game apparatus and including microcomputers, etc., and an image display unit for displaying game images, based on image signals outputted by the game control unit. On the image display unit positioned opposite to the simulated gun, enemies, targets to be shot, and backgrounds surrounding the enemies are displayed.

In a game, a game player aims the muzzle of the simulated gun at a target displayed on the game screen and triggers to shoot. A photo sensor for detecting light radiated from the game screen is disposed within the muzzle of the simulated gun, and a photo sensor circuit is disposed within the body of the simulated gun.

In the game, the game player aims the muzzle at an enemy displayed on the game screen and triggers. When triggered, a white trigger screen is displayed. The photo sensor in the muzzle detects white of the trigger screen, and the detected signal is inputted to a game control unit through the photo sensor circuit. In the game control unit, a position of the muzzle of the simulated gun is determined, based on the input of the detected signal indicative of the detection of the white, and coordinate values of the determined position are detected by using a vertical flyback time between fields or frames to make processing of judging whether or not a target was shot, and other processing.

In the conventional shooting game apparatus, the processing of a detected indicated position is thus made by using a vertical retrace time for every field or frame of the video screen. Accordingly, when a plurality of game players take part in the game, for the detection of indicated positions of all the game players, fields or frames of a numbers of the game players are necessary, which delay responses to commands of the game players. There is a risk that this may give stress to the game players.

Furthermore, in order to make the indicated position processing for the simulated guns of a plurality of game players by using one field or frame, hardware, such as registers or others, of a number corresponding to a plurality of the simulated guns are necessary, which adds to costs. In addition, other processing must be made within a vertical flyback time. There is a risk that processing necessary for the detection of coordinates of determined positions of a plurality of the simulated guns, the judgement, etc. could not be finished within a vertical flyback time.

SUMMARY OF THE INVENTION

An object of the present invention is to provide an indicated position detecting method and device for detecting an indicated position on a video screen in quick response to an indication, which does not increase costs for detection of a plurality of indicated position.

The above-described object is achieved by a video screen indicated position detecting method for detecting an indicated position on a video screen indicated by position indicating means, indicated position detection processing for detecting the indicated position being performed in each horizontal scan for displaying the video screen.

In the above-described video screen indicated position detecting method, it is possible that respective indicated position detection processing for detecting a plurality of indicated positions indicated on the video screen by a plurality of the position indicating means is performed for the respective indicated positions in every horizontal scan of one field or frame.

In the above-described video screen indicated position detecting method, it is possible that the respective indicated position detection processing for detecting said plurality of indicated positions indicated on the video screen by said plurality of the position indicating means is performed sequentially at every a plurality of successive horizontal scans of one field or frame.

In the above-described video screen indicated position detecting method it is possible that said plurality of position indicating means are divided in at least two groups, that the indicated position detection processing for detecting the indicated positions indicated on the video screen by the position indicating means of one of the two groups is performed by every horizontal scan of one field or frame, and that the indicated position detection processing for detecting the indicated positions indicated on the video screen by the position indicating means of the other of the two groups is performed by every horizontal scan of another field or frame.

In the above-described video screen indicated position detecting method, it is possible that the video screen is divided in at least a plurality of regions, and that respective indicated position detection processing for indicating the indicated positions indicated by said plurality of position indicating means is performed in the respective plural regions.

In the above-described video screen indicated position detecting method, it is possible that the indicated position detection processing includes: a first processing for determining, in the horizontal scan, coordinate values of the indicated position indicated based on an indication signal supplied by the position indicating means, and a second processing for inputting the determined coordinate values synchronously with a flyback time of the horizontal scan.

The above-described object is achieved by a video screen indicated position detecting device for detecting an indicated position indicated by position indicating means on the video screen, the device comprising position indicating means for performing indicated position detection processing at every horizontal scan displaying the video screen.

In the above-described video screen indicated position detecting device, it is possible that the indicated position detecting means performs respective indicated position detection processing for detecting a plurality of indicated positions indicated on the video screen by a plurality of the position indicating means is performed for the respective indicated positions in every horizontal scan of one field or frame.

In the above-described video screen indicated position detecting device, it is possible that the respective indicated position detection processing for detecting said plurality of indicated positions indicated on the video screen by said plurality of the position indicating means is performed sequentially at every a plurality of successive horizontal scans of one field or frame.

In the above-described video screen indicated position detecting device, it is possible that said plurality of position indicating means are divided in at least two groups, that the indicated position detection processing for detecting the indicated positions indicated on the video screen by the position indicating means of one of the two groups is performed by every horizontal scan of one field or frame, and that the indicated position detection processing for detecting the indicated positions indicated on the video screen by the position indicating means of the other of the two groups is performed by every horizontal scan of another field or frame.

in the above-described video screen indicated position detecting device, it is possible that the video screen is divided in at least a plurality of regions, and that respective indicated position detection processing for indicating the indicated positions indicated by said plurality of position indicating means is performed in the respective plural regions.

In the above-described video screen indicated position detecting device, it is possible that the indicated position detection processing includes: a first processing for determining, in the horizontal scan, coordinate values of the indicated position indicated based on an indication signal supplied by the position indicating means, and a second processing for inputting the determined coordinate values synchronously with a flyback time of the horizontal scan.

According to the present invention, process for detecting an indicated position is performed at every horizontal scan displaying the video screen, whereby even when a plurality of indicated positions are detected, the indications can be quickly responded without increasing costs of the device.

DETAILED DESCRIPTION OF THE INVENTION

Figure 1:
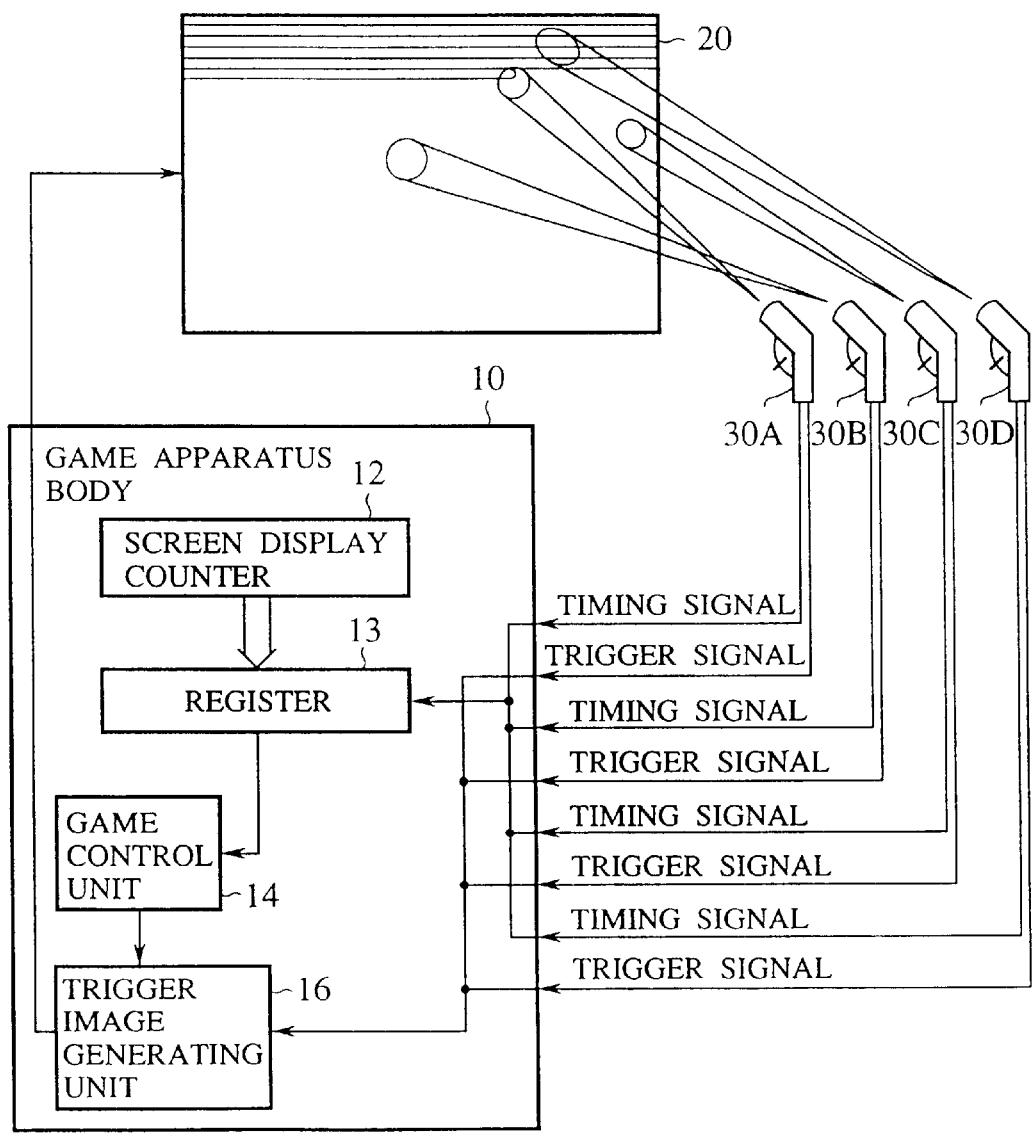
FIG. 1 is a view diagrammatically explaining a shooting game apparatus of a first embodiment of the present invention.
Figure 2:
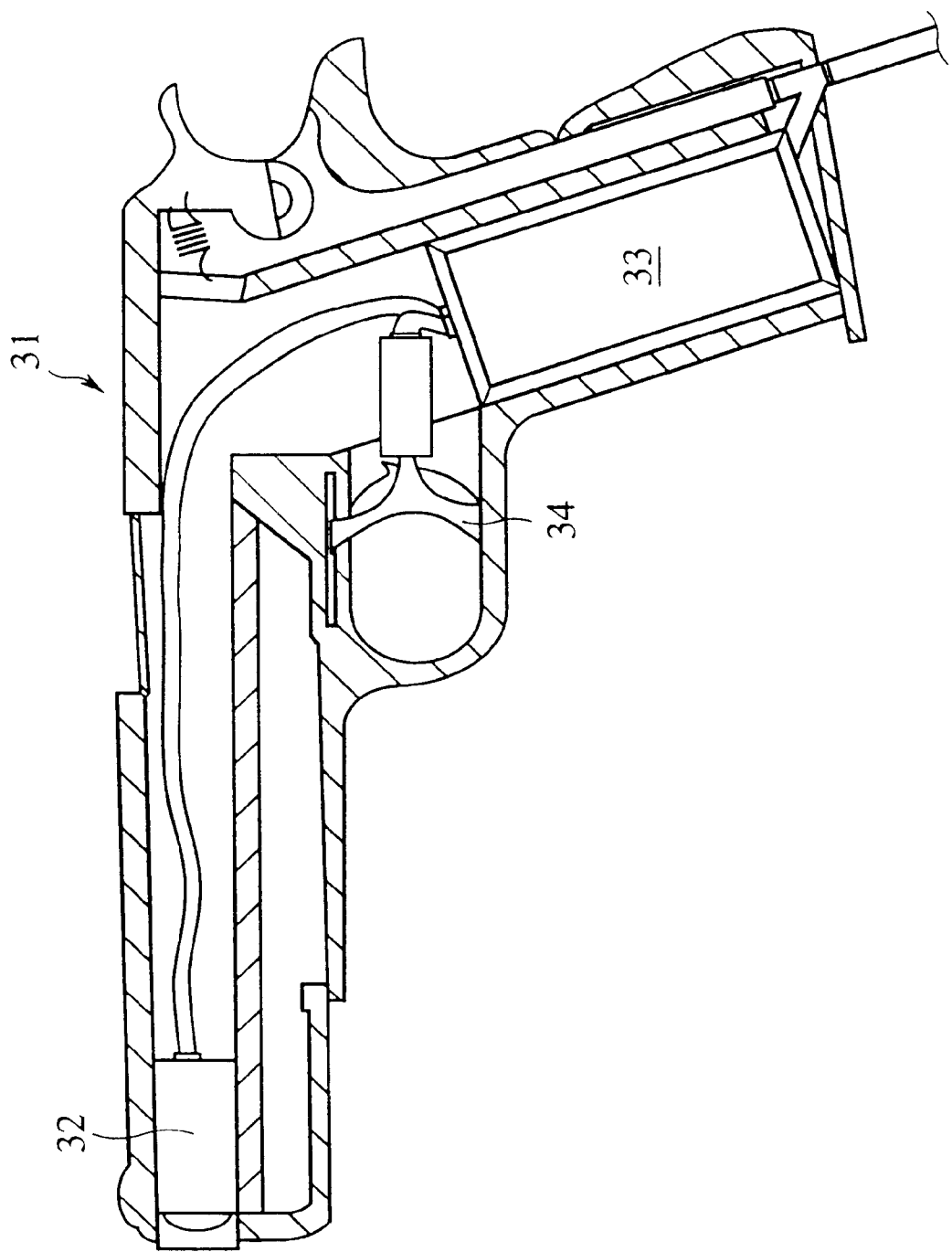
FIG. 2 is a sectional view of a simulated gun used in the shooting game apparatus according to the embodiment of the present invention.
Figure 3A:
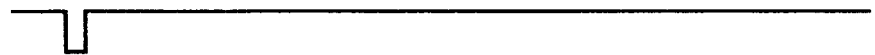
FIGS. 3A–3E are time charts of the shooting game apparatus of the first embodiment of the present invention.
Figure 3B:
Figure 3C:
Figure 3D:
Figure 3E:
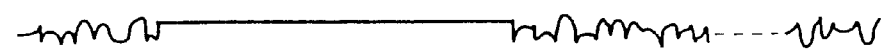

The shooting game apparatus of one embodiment of the present invention will be explained with reference to FIGS. 1 to 9. FIG. 1 is a diagrammatic view of the shooting game apparatus according to the present embodiment. FIG. 2 is a view of an interior structure of a simulated gun used in the shooting game apparatus of the present embodiment.

As shown in FIG. 1, the shooting game apparatus of the present embodiment includes a game apparatus body 10 for making various processing of a shooting game, and an image monitor means 20 for displaying game screens. Four simulated guns 30A, 30B, 30C, 30D are connected to the game apparatus body 10. Four game players can take part in the shooting game.

As shown in FIG. 2, each simulated gun 30A, 30B, 30C, 30D includes within a gun body 31 a photo sensor 32 for detecting light from the image monitor means 20, and a photo sensor circuit 33 for detecting intense light by the photo sensor 32. The photo sensor 33 outputs to the game apparatus body 10 a detected signal of intense light as a timing signal. A trigger signal is also outputted to the game apparatus body 10 by a trigger 34.

The game apparatus body 20 includes a trigger image generating unit 16 which generates on the image monitor means 20 a white trigger image to be caused to glow in response to a trigger signal from the simulated guns 30A, 30B, 30C, 30D. When a trigger signal is outputted by one of the simulated guns 30A, 30B, 30C, 30D, a trigger image is displayed in response to the trigger signal.

The game apparatus body 10 includes a screen display counter 12 which counts a number of scanning line to be displayed on the screen of the image monitor means 20, and a register 12 which temporarily stores a value given by the screen display counter 13. A value given by the screen display counter 12 is set in the register 13 in response to a timing signal from a simulated gun 30A, 30B, 30C, 30D. The value set in the register 13 is to be coordinate values of an indicated position of the simulated gun 30A, 30B, 30C, 30D on the monitor screen. The value set in the register 13 is inputted to a game control unit 14 in a horizontal flyback time of scanning lines. The game control unit 14 makes game processing of judging whether a target was shot, and other processing, by using the indicated position of the simulated gun 30A, 30B, 30C, 30D on the monitor screen.

When one of the simulated guns 30A, 30B, 30C, 30D is triggered, as shown in FIG. 3, a trigger signal SS (FIG. 3A) is outputted. The trigger image generation unit 16 generates a switch signal ST for switching to, e.g., a trigger image for one field synchronously with a vertical flyback time interrupt signal VS (FIG. 3C) after the rise of the trigger signal SS. The switch signal ST makes an RGB signal (FIG. 3E) of a monitor image to be a signal of a constant voltage, and a white trigger image is displayed on the image monitor means 20.

Figure 4A:
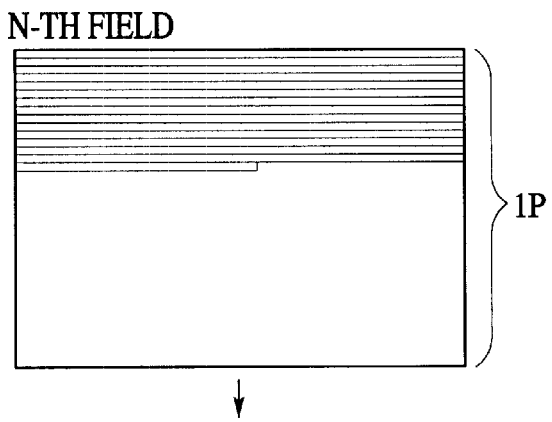
FIGS. 4A–4D are views explaining the conventional indicated position detecting method.
Figure 4B:
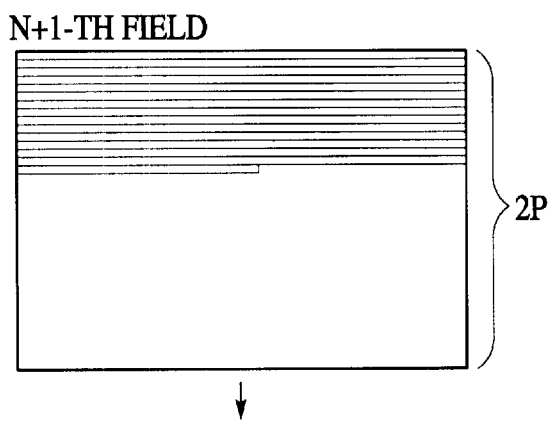
Figure 4C:
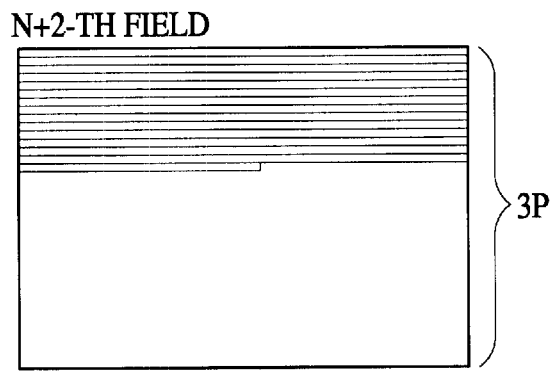
Figure 4D:
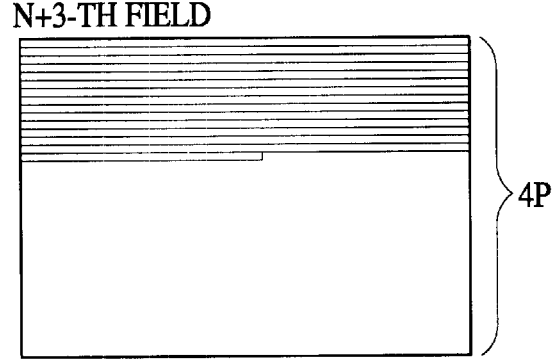

As described above, in the conventional shooting game apparatus, in a vertical flyback time between fields of the video screen, coordinate values of an indicated position are inputted to make the processing of judging whether or not a target was shot, other processing. Accordingly, as shown in FIG. 4 four continuous fields are required for four game players 1P, 2P, 3P, 4P. That is, the indicated position detection processing for the simulated gun 30A of the game player 1P is made in the n-Th field (FIG. 4A), that for the simulated gun 30B of the 2P game player (FIG. 4B) is made in the n+1-th field, the indicated position detection processing for the simulated gun 30C of the game player 3P is made in the n+2-th field (FIG. 4C), and that for the simulated gun 30D of the game player 4P is made in the n+3-th field (FIG. 4D).

Figure 5:
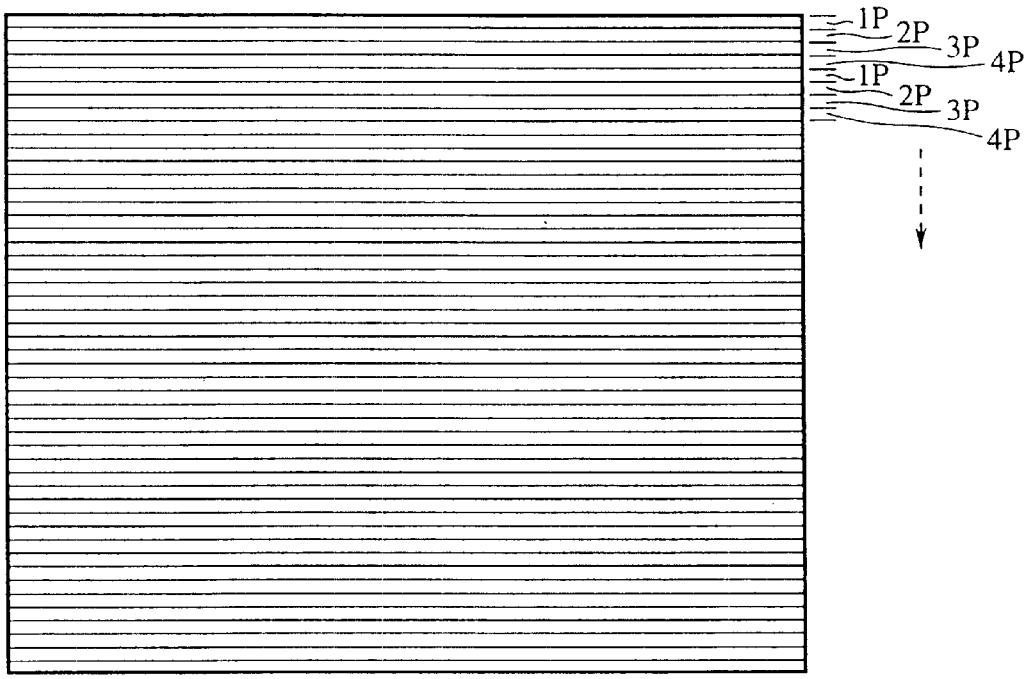
FIG. 5 is a view explaining the shooting game apparatus of the first embodiment of the present invention.

However, the present embodiment is characterized in that the indicated position detection processing is made at every horizontal scan of the video screen. Indicated positions of the respective simulated guns 30A, 30B, 30C, 30D are detected by one horizontal scan of the video screen. That is, as shown in FIG. 5, an indicated position of the simulated gun 30A of the game player 1P is detected by a first horizontal scan of the video screen. An indicated position of the simulated gun 30B of the game player 2P is detected by a second horizontal scan of the video screen. An indicated position of the simulated gun 30C of the game player 3P is detected by the third horizontal scan of the video screen. An indicated position of the simulated gun 30D of the game player 4P is detected by the fourth horizontal scan of the video screen. This processing is repeated to sequentially detect indicated positions of the simulated guns 30A to 30D of the game players 1P to 4P. Thus, indicated positions of the simulated guns 30A, 30B, 30C, 30D of the simulated guns 30A, 30B, 30C, 30D of the four game players 1P, 2P, 3P, 4P can be detected by using one field.

In the method according to the present embodiment, the indicated position detection processing for the respective game players is made at every 4 scanning lines. Accordingly, a range detected by the photo sensors 34 of the simulated guns 30A, 30B, 30C, 30D may have a size of at least 4 scanning lines or more, where indicated positions can be detected without failure.

Figure 6:
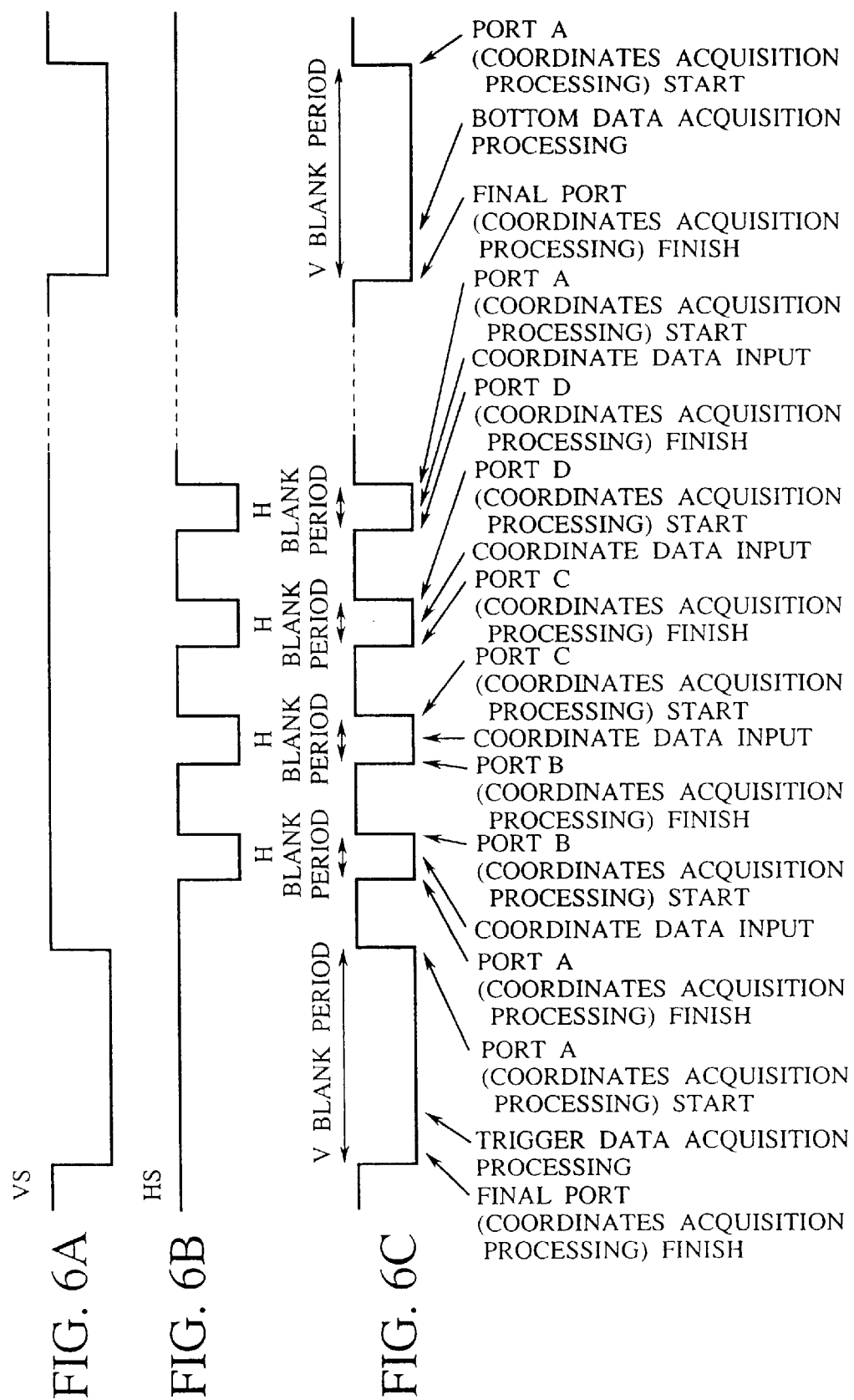
FIGS. 6A–6C are time charts of the shooting game apparatus of the first embodiment of the present invention.
Figure 7:
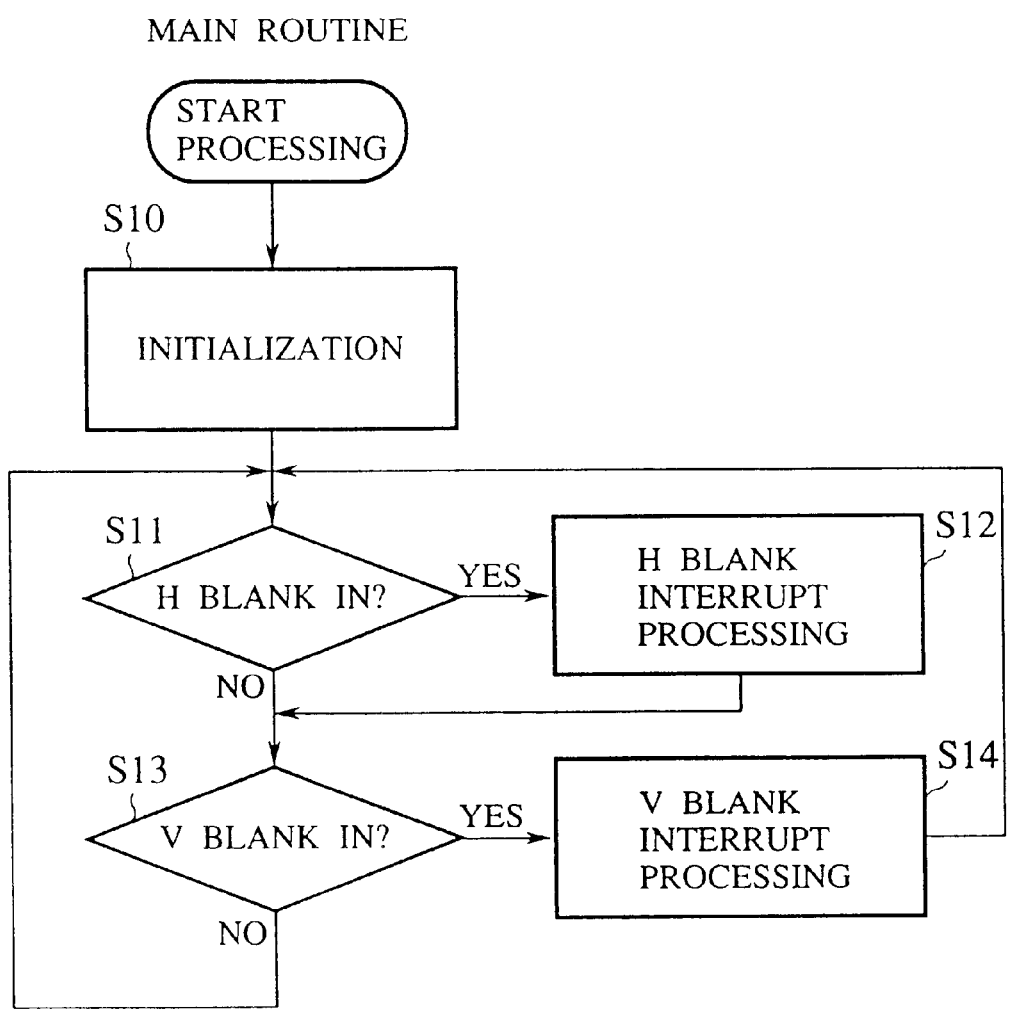
FIG. 7 is a flow chart of a main routine of the shooting game apparatus of the embodiment of the present invention.
Figure 8:
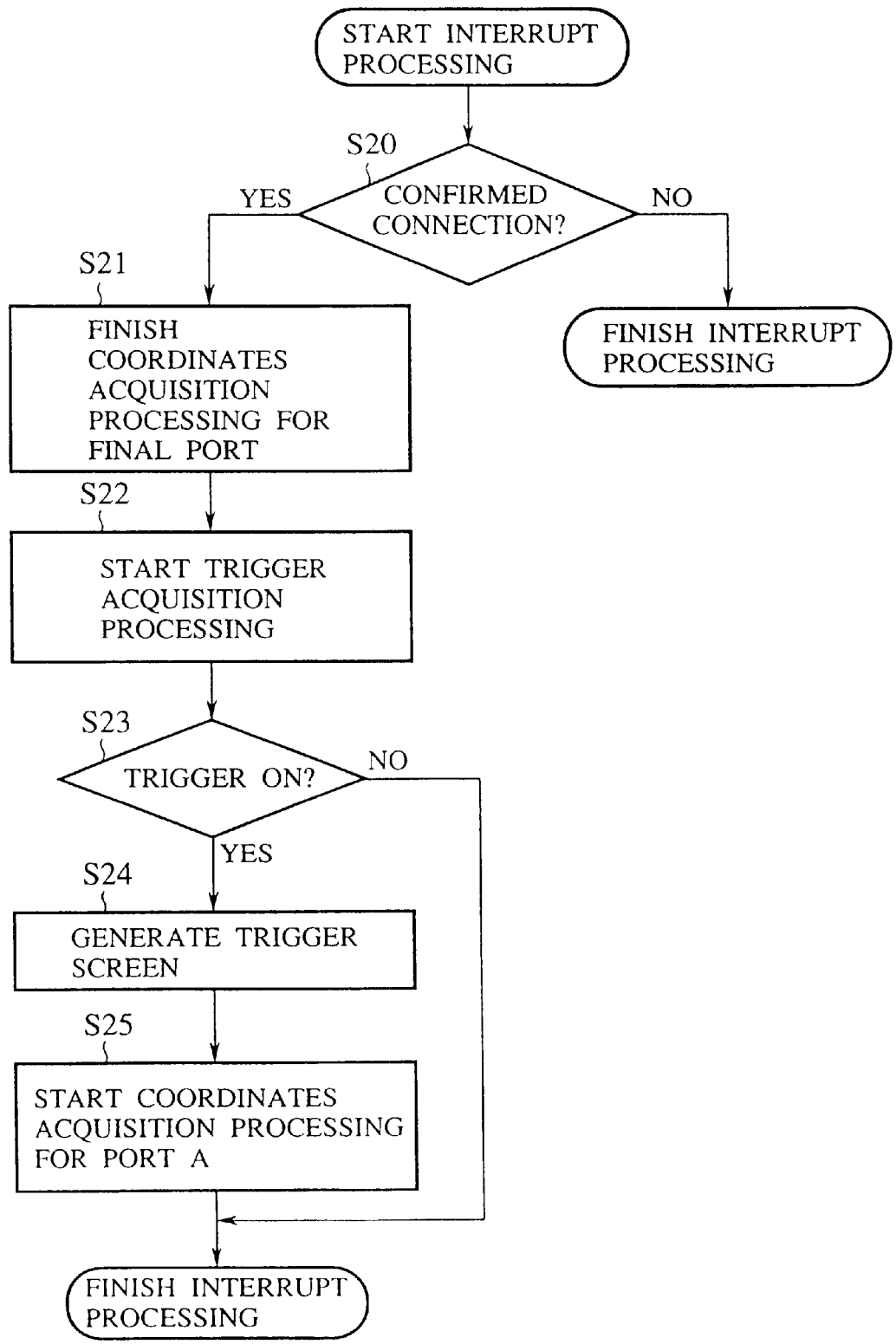
FIG. 8 is a flow chart of vertical retrace line interruption processing of the shooting game apparatus of the embodiment of the present invention.
Figure 9:
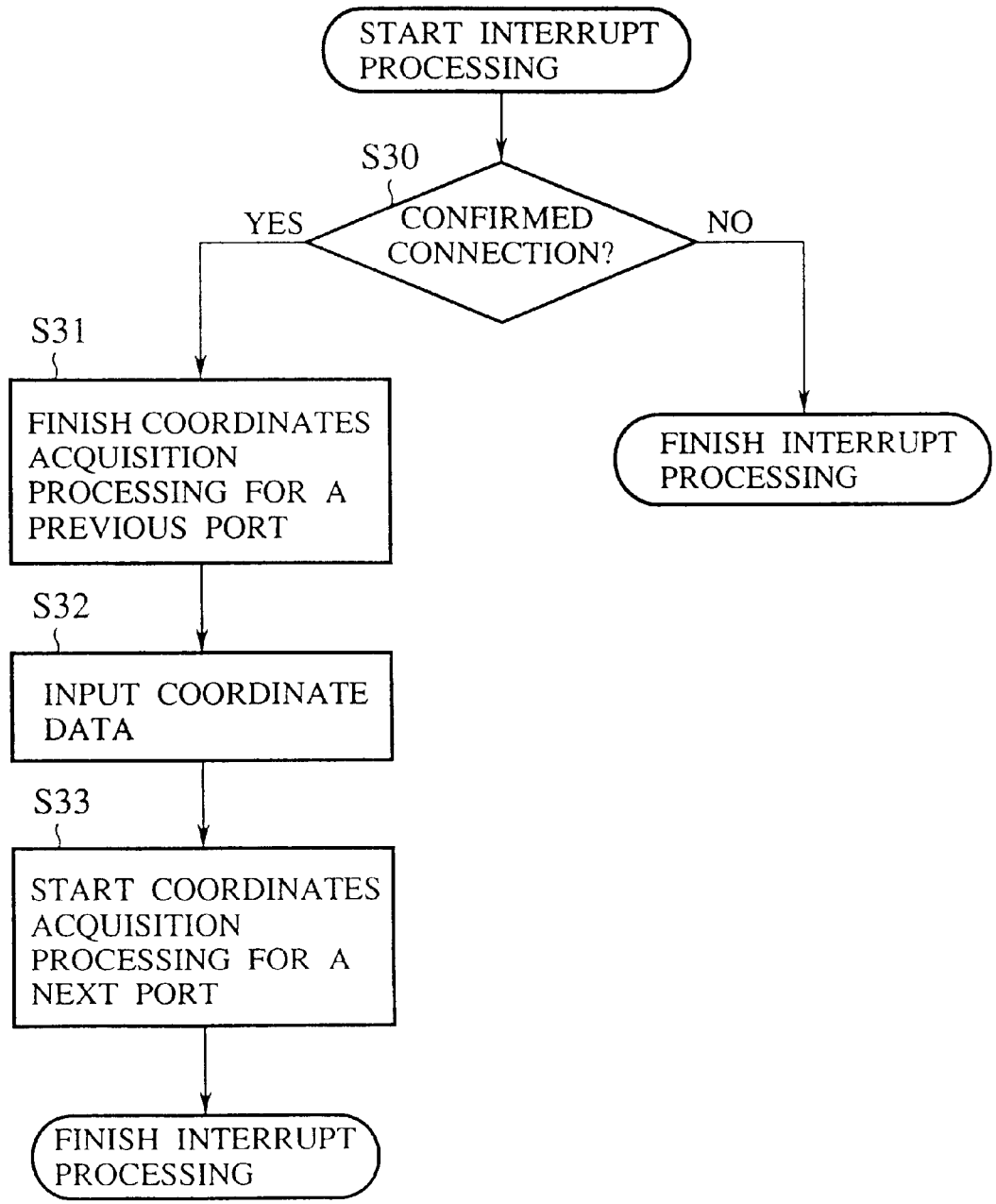
FIG. 9 is a flow chart of horizontal retrace line interruption processing of the shooting game apparatus of the embodiment of the present invention.

Then, the indicated position detecting method according to the present embodiment will be detailed with reference to FIGS. 6 to 9. FIG. 6 is a time chart which explains the indicated position detecting method. FIGS. 7 to 9 are flow charts which explain the indicated position detecting method.

As shown by the flow chart of FIG. 7, in a main routine, initialization, as of data clear, etc., is performed (Step S10), and then whether or not an interrupt signal is inputted in a horizontal flyback time (Step S11). When an interrupt signal is inputted in a horizontal flyback time, horizontal flyback time interrupt processing is performed in Step S12 which will be explained later (Step S12).

Then, it is judged whether or not a vertical flyback time interrupt signal is inputted (Step S13). Unless no vertical flyback interrupt signal is inputted, Step S11 follows. When a vertical flyback interrupt signal is inputted, the vertical flyback interrupt processing which will be explained later is performed in Step S14, and Step S11 follows.

As shown by the flow chart of FIG. 8, in the vertical flyback time processing, first it is confirmed whether or not the simulated guns 30A, 30B, 30C, 30D are connected to the game apparatus body 10 (Step S20). Unless the simulated guns 30A, 30B, 30C, 30D are connected to the game apparatus body 10, the interrupt processing is immediately finished.

When the simulated guns 30A, 30B, 30C, 30D are correctly connected to the game apparatus body 10, coordinate acquisition processing of the final port which has been performing coordinate acquisition of the game apparatus body 10 with the simulated guns 30A, 30B, 30C connected to is finished (Step S21). Subsequently, trigger acquisition processing is started (Step S22).

Then, it is judged whether or not a trigger signal of one of the simulated guns 30A, 30B, 30C, 30D has been inputtted (Step S23). When a trigger signal has been inputted, the screen is flashed to generate a trigger image (Step S24). Subsequently, the coordinate acquisition processing for the port A with the simulated gun 30A connected to is started (Step S25), and the vertical flyback time interrupt processing is finished.

As shown by the flow chart of FIG. 9, in the horizontal flyback time interrupt processing, first it is judged whether or not the simulated guns 30A, 30B, 30C, 30D are connected to the game apparatus body 10 (Step S30). Unless the simulated guns 30A, 30B, 30C, 30D are connected to the game apparatus body 10, the interrupt processing is immediately finished.

When the simulated guns 30A, 30B, 30C, 30D are correctly connected to the game apparatus body 10, the coordinate acquisition processing which is currently being performed for a port is finished (Step S31). Acquired coordinate data is inputted to the game control unit 14 (Step S32). Then, the coordinate acquisition processing for a next port is started (Step S33), and the horizontal flyback time interrupt processing is finished.

Next, with reference to the time chart of FIG. 6, processing between a vertical flyback time and a next vertical flyback time will be explained.

When a vertical flyback time interrupt signal VS is outputted, the coordinate acquisition processing for a final port is finished in accordance with the flow chart of FIG. 8, and the trigger acquisition processing is made. At the end of a vertical flyback time the coordinate acquisition processing is started for the port A with the simulated gun 30A connected to.

Subsequently, one scanning line is drawn, and when a horizontal flyback time interrupt signal HS is outputted, the coordinate acquisition processing of the part A is finished in accordance with the flow chart of FIG. 9, and coordinate data of the simulated gun 30A is inputted. At the end of the horizontal flyback time the coordinate acquisition processing for the port B with the subsequent simulated gun 30B connected to is started.

Subsequently, a next one scanning line is drawn, and a horizontal flyback time interrupt signal HS is outputted. Then, the coordinate acquisition processing of the port C is finished in accordance with the flow chart of FIG. 9, coordinate data of the simulated gun 30B is inputted. At the end of the horizontal flyback time the coordinate acquisition processing for the port D with the subsequent simulated gun 30C connected to is started.

Subsequently, a next one scanning line is drawn. When a horizontal flyback time interrupt signal HS is outputted, the coordinate acquisition processing for the part D is finished in accordance with the flow chart of FIG. 9, and coordinate data of the simulated gun 30B is inputted. At the end of the horizontal flyback time the coordinate acquisition processing for the port A with the subsequent simulated gun 30C connected to is started.

This processing is repeated synchronously with a horizontal flyback time interrupt signal until the scan of a field is finished.

Then, the scan of the field is over, and when a vertical flyback time interrupt signal VS is outputted, the coordinate acquisition processing of a port where the last coordinate acquisition processing has been made is finished in accordance with the flow chart of FIG. 8, and trigger data is acquired. At the end of the vertical flyback time the coordinate acquisition processing for the port A with the simulated gun 30A connected to is started. The same processing is repeated.

As described above, according to the present embodiment, indicated positions of a plurality of simulated guns can be detected in one field, whereby a shooting game which is quick in responding to indications can be realized without increasing costs of the apparatus.

In the present embodiment when a trigger signal is outputted from one of four simulated guns 30A, 30B, 30C, 30D, indicated positions of all the simulated guns 30A, 30B, 30C, 30D are detected, which causes no problem to advance of the shooting game because the game apparatus body 10 knows which one of the simulated guns has outputted a trigger signal.

Indicated positions of all the simulated guns 30A, 30B, 30C, 30D at the time that the trigger image is displayed may be detected to be temporarily stored, whereby when a trigger signal is outputted, immediately after the trigger image is displayed, from another simulated gun, the already detected indicated position may be used without again displaying the trigger image. As a result, even in a shooting game played by a plurality of game players, the trigger image may not be frequently displayed, which can make display of the game screens natural.

Indicated positions of all the simulated guns 30A, 30B, 30C, 30D are detected at the time of display of the trigger image, whereby positions at which the muzzles of the simulated guns 30A, 30B, 30C, 30D can be always known. As a result, this allows various contrivances to be made in advance of the shooting game.

A photo detection signal may be outputted from one of the simulated guns 30A, 30B, 30C, 30D that has been triggered. In this case, it is not necessary to detect indicated positions of those of the simulated guns 30A, 30B, 30C, 30D which have not been triggered. This enables the position detection of higher resolution.

The present invention is not limited to the above-described embodiment and covers other various modifications. For example, in the above-described embodiment the simulated guns to be detected at every horizontal scan are sequentially changed, but may be changed in other ways.

Figure 10:
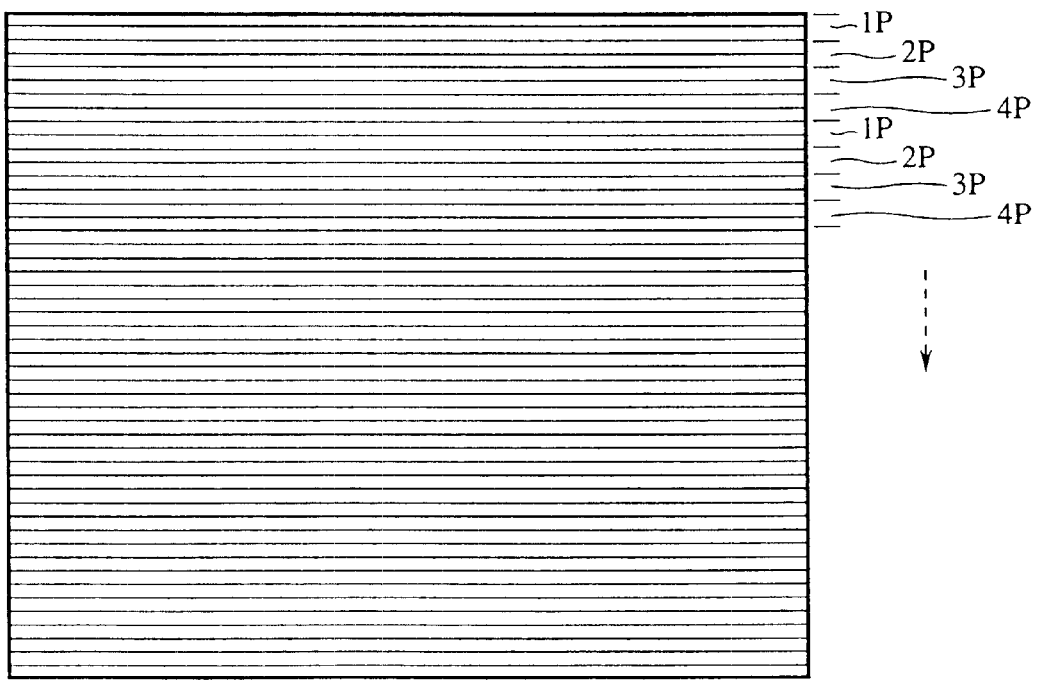
FIG. 10 is a view explaining the shooting game apparatus of another embodiment of the present invention.

For example, as shown in FIG. 10, the simulated guns may be detected at every two horizontal scanning lines. That is, an indicated position of the simulated gun P1 of a game player 1P is detected by the first horizontal scan and the second horizontal scan of the video screen. An indicated position of the simulated gun 30B of a game player 2P is detected by the third horizontal scan and the fourth horizontal scan of the video screen. An indicated position of the simulated gun 30C of a game player 3P is detected by the fifth horizontal scan and the sixth horizontal scan of the vide screen. An indicated position of the simulated gun 30D of a game player 4P is detected by the seventh horizontal scan and the eighth horizontal scan of the video screen. This processing is repeated to sequentially detect indicated positions of the simulated guns 30A to 30D of the game players 1P to 4P. An indicated position of one simulated gun is defected by using two horizontal scanning lines, whereby the indicated position can be correctly detected without failure.

Figure 11A:
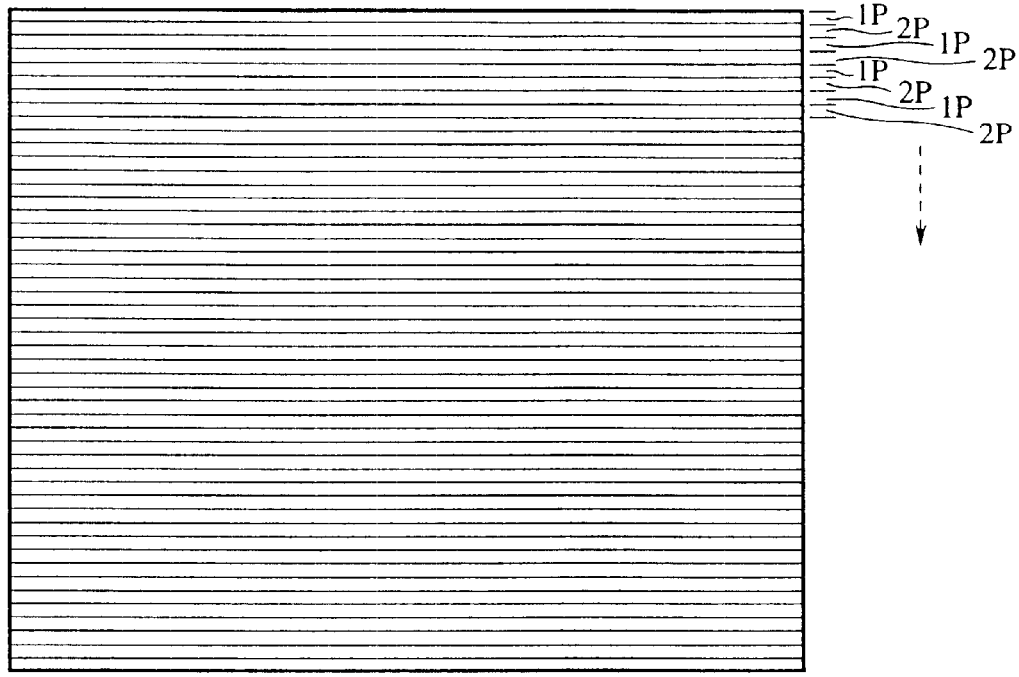
FIGS. 11A–11B are views explaining the shooting game apparatus of further another embodiment of the present invention.
Figure 11B:
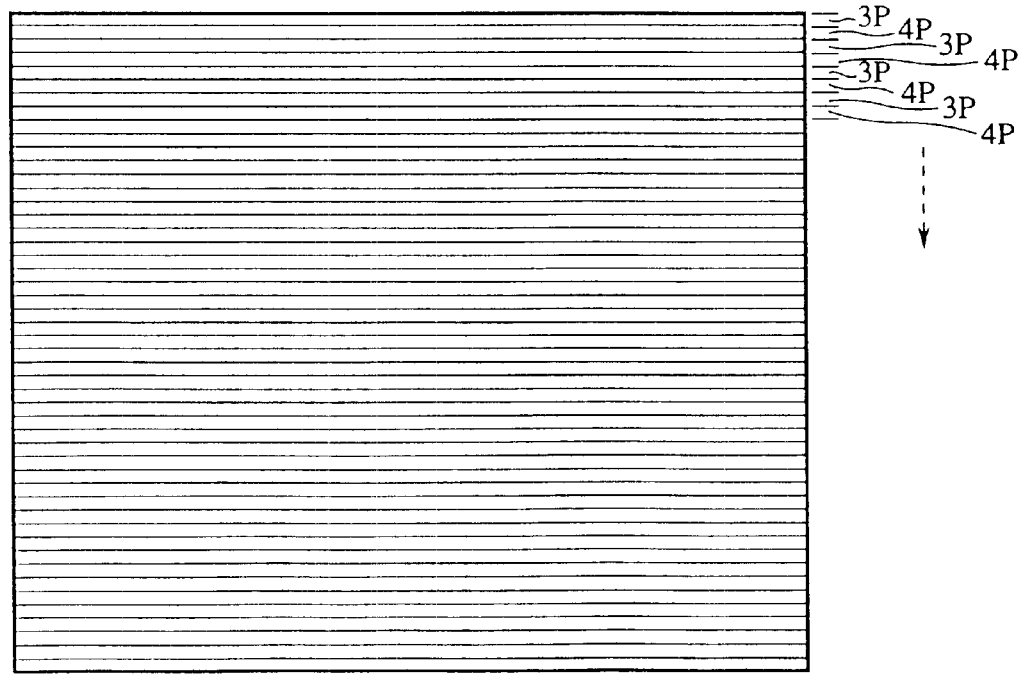

It is also possible that, as shown in FIG. 11, in the n-th field an indicated position of the simulated gun 30A of a game player P1 is detected by the first horizontal scan of the video screen, and an indicated position of the simulated gun 30B of a game player 2P is detected by the second horizontal scan of the video screen, and the detection is repeated. In the n+1-th field an indicated position of the simulated gun 30C of a game player 3P is detected by the first horizontal scan of the video screen, and an indicated position of the simulated gun 30D of a game player 4P is detected by the second horizontal scan of the video screen. This detection is repeated. Thus, indicated positions of the simulated guns 30A, 30B, 30C, 30D of four game players 1P, 2P, 3P, 4P can be detected in two fields.

Figure 12:
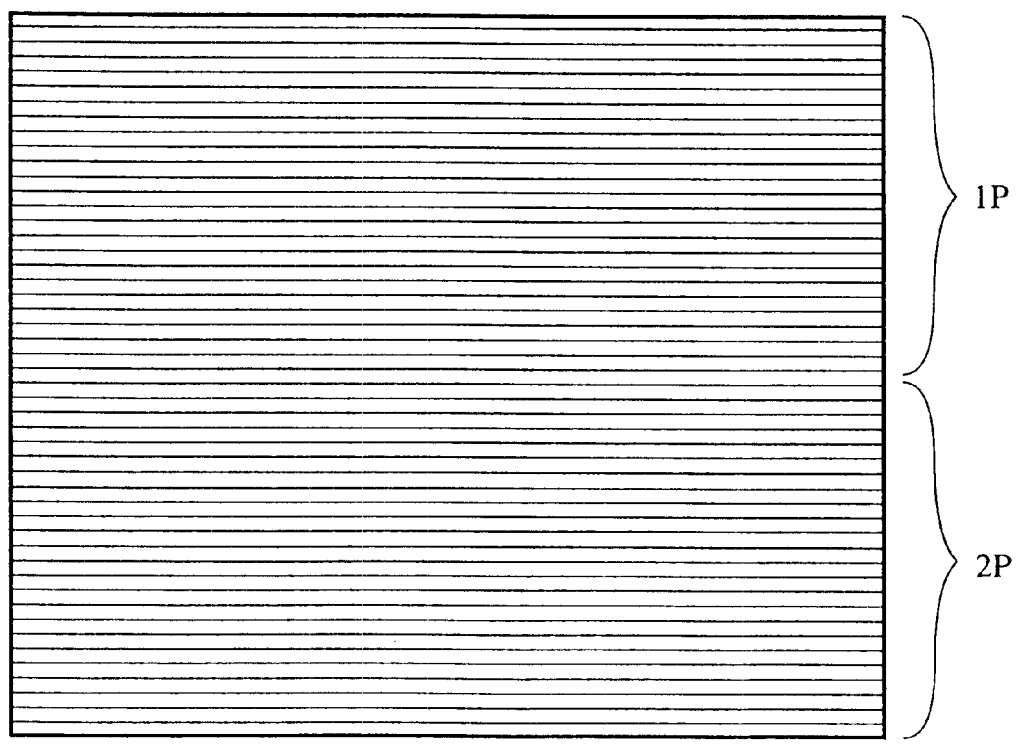
FIG. 12 is a view explaining the shooting game apparatus of more further another embodiment of the present invention.

It is also possible that the video screen is divided in regions, and indicated positions of the simulated guns are detected in the regions associated with the simulated guns. That is, as shown in FIG. 12, the video screen is divided in two regions, and an indicated position of the simulated gun 30A of a game player 1P is detected by every horizontal scan in the upper region, and an indicated position of the simulated gun 30B of a game player 2P is detected by every horizontal scan in the lower region. Thus, an indicated position of a game player associated with a region can be detected.

It is possible that a program for indicated position processing may be changed corresponding to a position of the horizontal scan of the video screen. Different algorithm detection of indicated positions is possible for regions of the video screen.

In the above-described embodiment the present invention is applied to a shooting game apparatus, but may be applied to indicated position detection of other game apparatuses.

It is possible that a program for executing the indicated position detecting method for detecting indicated positions on a video screen may be provided, stored in an information storage medium, such as a floppy disc, CD-ROM or others, or may be provided on-line via communication circuits.

What is claimed is:

1. A video screen indicated position detecting method for detecting a first plurality of indicated positions on a video screen indicated by a plurality of position indicating means, the method comprising:

associating each horizontal scan line of said video screen with one of the plurality of position indicating means, wherein adjacent horizontal scan lines are associated with different ones of the plurality of position indicating means;

during a scan portion of a current horizontal scan line, detecting an indicated position indicated by one of the plurality of position indicating means associated with the current horizontal scan line, and during a flyback portion of the current horizontal scan line, transmitting a coordinate of the indicated position.

2. A video screen indicated position detecting method according to claim 1, wherein respective indicated position detection processing for detecting a plurality of indicated positions indicated on the video screen by a plurality of the position indicating means is performed for the respective indicated position in each horizontal scan line of one field or frame.

3. A video screen indicated position detecting method according to claim 2, wherein the respective indicated position detection processing for detecting said plurality of indicated positions indicated on the video screen by said plurality of position indicating means is performed sequentially for a plurality of successive horizontal scans of one field of frame.

4. A video screen indicated position detecting method according to claim 2, wherein the video screen is divided in at least a plurality of regions, and respective indicated position detection processing for indicating the indicated positions indicated by said plurality of position indicating means is performed in the respective plural regions.

5. A video screen indicated position detecting device for detecting a plurality of indicated positions indicated by a plurality of position indicating means on the video screen, the device comprising:

a position indicating means for associating each horizontal scan line of said video screen with the plurality of position indicating means and for detecting, during a scan portion of a current horizontal scan line, an indicated position indicated by the indicated means associated with the current horizontal scan line; and a coordinate transmitting means for transmitting, during a horizontal flyback portion of the current horizontal scan line, a coordinate corresponding to said indicated position, wherein adjacent horizontal scan lines are associated with different ones of the plurality of position indicating means.

6. A video screen indicated position detecting device according to claim 5, wherein the indicated position detecting means performs respective indicate position detection processing for detecting the plurality of indicated positions indicated on the video screen by the plurality of the position indicating means is performed for the respective indicated positions in every horizontal scan line of one field or frame.

7. A video screen indicated position detecting device according to claim 6, wherein the respective indicated position detection processing for detecting said plurality of indicated positions indicated on the video screen by said plurality of the position indicating means is performed sequentially at every a plurality of successive horizontal scan lines of one field or frame.

8. A video screen indicated position detecting device according to claim 6, wherein
the video screen is divided in at least a plurality of regions, and
respective indicated position detection processing for indicating the indicated positions indicated by said plurality of position indicating means is performed in the respective plural regions.

9. An information storage medium storing a program for executing a video screen indicated position detecting method, said method comprising:
associating each horizontal scan line of said video screen with a plurality of position indicating means, wherein adjacent horizontal scan lines are associated with different ones of the plurality of position indicating means; and
during a scan portion of a current horizontal scan line, detecting an indicated position indicated by a position indicating means associated with the current horizontal scan line; and
during a flyback portion of the current horizontal scan line, transmitting a coordinate corresponding to said indicated position.

10. An information storage medium as defined in claim 9, wherein said method further comprises:
performing respective indicated position detection processing for detecting a plurality of indicated positions indicated on the video screen by a plurality of position indicating means, wherein said processing is performed for the respective indicated positions in respective horizontal scan lines of one field or frame.

11. An information storage medium as defined in claim 10, wherein said method further comprises:
performing respective indicated position detection processing for detecting said plurality of indicated positions indicated on the video screen by said plurality of position indicating means, wherein said processing is performed sequentially at every one of a plurality of successive horizontal scan lines of one field or frame.

12. An information storage medium as defined in claim 10, wherein
the video screen is divided in at least a plurality of regions, and
respective indicated position detection processing for indicating the each of indicated positions indicated by said plurality of position indicating means is performed in the respective plurality of regions.

13. A video screen position detecting device comprising:
a first detector adapted to detect a first position on a video screen;
a second detector adapted to detect a second position on the video screen;
coordinate encoder, wherein said coordinate encoder
is adapted to associated each horizontal scan line of said video screen with said first or second detectors, wherein adjacent horizontal scan lines are associated with different ones of said first and second detectors; and
during a scan portion of a current horizontal scan line, if the current horizontal scan line is associated with the first detector, detecting the first position; or if the current horizontal scan line is associated with the second detector, detecting the second position;
a transmitter, wherein
during a flyback portion of the current horizontal scan line,
if the current horizontal scan line is associated with said first detector, said transmitter transmits a first coordinate corresponding to the first position, or if the current horizontal scan line is associated with said second detector, said transmitter transmits a second coordinate corresponding to the second position.

14. A method of detecting an indicated location on a video screen comprising:
orienting an first optical sensor to detect light from a first region at a location on a video screen;
orienting an second optical sensor to detect light from a second region at a location on a video screen;
associating each horizontal scan line of said video screen with one of said first or second optical sensors, wherein adjacent horizontal scan lines are associated with different ones of said first or second optical sensors;
during a scan portion of a current horizontal scan line, if the current horizontal scan line is associated with said first optical sensor, detecting a change in luminescence of light emitted from said first region; or if the current horizontal scan line is associated with said second optical sensor, detecting a change in luminescence of light emitted from said second region;
during a horizontal flyback portion of the current horizontal scan line,
if the current horizontal scan line is associated with said first optical sensor, transmitting a first coordinate of said first region; or
if the current horizontal scan line is associated with said second optical sensor, transmitting a second coordinate of said second region.

15. An indicated location detection device comprising:
a first optical sensor adapted to detect a change in luminescence of light emitted from a first region of a video screen at a first time; and a second optical sensor adapted to detect a change in luminescence of light emitted from a second region of a video screen at a second time; and wherein a device,
  associates each horizontal scan line of said video screen with one of said first and second optical sensors, wherein adjacent horizontal scan lines are associated with different ones of said first and second optical sensors;
  during a horizontal scan portion of a current horizontal scan line,
    if said current horizontal scan line is associated with said first optical sensor, detect said first region; or
    if said current horizontal scan line is associated with said second optical sensor, detect said second region; and
  during a flyback portion of the current horizontal scan line,
    if said current horizontal scan line is associated with said first optical sensor, transmit a first coordinate associated with said first region; or
    if said current horizontal scan line is associated with said second optical sensor, transmit a second coordinate associated with said second region.

* * * * *